Patented Oct. 18, 1932

1,882,762

UNITED STATES PATENT OFFICE

HERMAN A. BRUSON, OF PHILADELPHIA, PENNSYLVANIA, ASSIGNOR TO THE RESINOUS PRODUCTS & CHEMICAL COMPANY, A CORPORATION OF DELAWARE

ACIDS FROM PETROLEUM HYDROCARBONS AND METHOD OF PRODUCING SAME

No Drawing.    Application filed October 10, 1929.  Serial No. 398,823.

This invention relates to organic acids derived from mineral petroleum oils and petroleum oil distillates, more particularly to new synthetic acids possessing resinous properties and valuable for the preparation of oil-soluble soaps, high boiling resinous esters, and solid resinous masses.

I have discovered that if the anhydride of a polybasic acid such as phthalic acid is heated with a petroleum hydrocarbon, such as crude petroleum oil itself or any of its hydrocarbon derivatives, such as kerosene, gasoline, mineral spirits, varnish makers' naphtha, petrolatum, paraffin wax, paraffin oil, and the like; in the presence of a condensing agent, preferably anhydrous aluminum chloride, that a reaction occurs between the aliphatic hydrocarbon and the acid anhydride whereby a complex aluminum salt is formed. The latter upon hydrolysis yields a mixture of keto-acids having most probably the general formula:

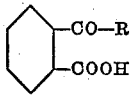

wherein R is an alkyl group derived from the aliphatic hydrocarbon present in the petroleum. This mixture of high molecular weight acids forms a resinous mass consisting of monobasic keto-acids which possess many unique properties. They form for example, high molecular weight soaps when treated with alkali. Moreover their heavy metal salts are insoluble in water, but soluble in organic solvents. They may thus find practical application in the textile industries or for the preparation of varnish driers, since their lead, cobalt, manganese, and iron salts are readily dispersable in linseed and other drying oils and act catalytically to rapidly dry them. Moreover, the esters of these acids, notably the ethyl, butyl and bornyl esters form high boiling viscous oils suitable as solvents, or, as plasticizers for nitrocellulose.

One method of practicing my invention is as follows:

In a cast iron, steam-jacketed vessel equipped with an agitator and reflux condenser which acts as a chimney, place a mixture consisting of

|  | Pounds |
|---|---|
| Phthalic anhydride | 30 |
| Ordinary low test gasoline | 100 |
| Anhydrous aluminum chloride | 60 |

The mixture is stirred, and then slowly heated to between 70° and 90° centigrade. A vigorous exothermic reaction sets in, and hydrogen chloride is copiously evolved. Heating is continued for 8–12 hours at 90° C. until no more hydrogen chloride comes off. The hot mixture is then carefully run into a capacious still which contains 150 pounds of sodium carbonate dissolved in hot water to form a 10% solution. The heat of reaction distills off some unchanged gasoline. The remainder of the excess gasoline is distilled off in a current of steam. When no more gasoline distills over, the contents of the still are filtered to remove the precipitate of aluminum hydroxide, and the clear filtrate which contains the sodium salts of the organic acids, formed by the condensation is acidified with dilute sulphuric acid. A yellowish waxy solid is precipitated. This consists of the mixture of keto-acids which were formed by the reaction. The material is washed with hot water to remove traces of inorganic salts and any unchanged phthalic acid. After drying it forms a reddish, amorphous mass which is readily soluble in alkalies and in various organic solvents such as benzol, ethyl acetate, acetone, and the like. The yield is about 50 pounds of acid.

I have prepared the heavy metal salts of this acid mixture and have found them to be insoluble in water but soluble in toluene and in turpentine, also in linseed oil and other drying oils. These include the cobalt, manganese, lead, iron, zinc, aluminum, chromium, copper and nickel salts. The first three salts especially, namely the cobalt, manganese and lead salts are very effective driers for drying oils.

The esters of these acids form high boiling viscous liquids of penetrating odor. The ethyl, butyl and bornyl esters for example are pleasant smelling viscous liquids capable of solubilizing nitrocellulose.

In practicing my invention I have not confined myself to only the above reaction with gasoline, but have also used instead of gasoline, equal weights of other related petroleum oil derivatives, namely kerosene, ligroin, petrolatum, paraffin wax, paraffin oil (both crude and refined), petroleum grease, crude and refined petroleum oil (Mid-continent, Pennsylvania and Western), "mineral spirits", varnishmakers' naphtha and high test gasolines, in order to obtain acid mixtures of different viscosities and physical properties. In the case of paraffin wax, petrolatum, and the high boiling petroleum oils it is advisable to heat the reaction mixture to a temperature of about 125° C. in order to effect complete condensation. This may be ascertained by the fact that no more hydrogen chloride is evolved upon continued heating.

Instead of aluminum chloride, anhydrous halide salts of other amphoteric elements may be employed, notably zinc chloride, stannic chloride, ferric chloride, and the like. However, anhydrous aluminum chloride is preferable because it is less expensive and gives a higher yield of acid.

I have also used in place of phthalic anhydride, the anhydrides of other polybasic acids, namely, succinic anhydride, maleic anhydride and camphoric anhydride. The reaction with these anhydrides is analogous to that with phthalic anhydride. The quantities which are to be used are in general two moles of aluminum chloride to one mole of acid anhydride, mixed with a sufficient excess of petroleum hydrocarbon to allow easy stirring at the elevated temperature employed.

It is evident that minor changes may be made in the method of preparing the hereinabove described acids without departing from the principles of the invention. For example, inert organic solvents such as nitrobenzene may be used for diluting the petroleum hydrocarbon during the course of the condensation in order to allow better agitation. Furthermore, the hydrolysis of the aluminum complex may be effected with acids instead of alkalies.

It is understood that in the following claims the expression "a petroleum hydrocarbon" is used to denote petroleum oils and any derivatives of their hydrocarbon degradation products or cracked distillates such as gasoline, kerosene, ligrolin, mineral naphthas, paraffin oil, paraffin wax, petrolatum, and the like.

What I claim is:

1. A method of preparing organic acids from gasoline which consists in heating gasoline with phthalic anhydride in the presence of anhydrous aluminum chloride and thereafter hydrolyzing the reaction product.

2. A composition of matter comprising the acid mixture obtained by condensing an essentially non-aromatic petroleum hydrocarbon with the anhydride of a polycarboxylic acid in the presence of a Friedel-Crafts catalyst and then hydrolyzing the reaction product.

3. A composition of matter comprising the acid mixture obtained by condensing gasoline with phthalic anhydride in the presence of a Friedel-Crafts catalyst, and hydrolyzing the reaction product.

4. A composition of matter comprising the acid mixture obtained by condensing petroleum naphthas with phthalic anhydride in the presence of a Friedel-Crafts catalyst, and hydrolyzing the reaction product.

5. A composition of matter comprising the acid mixture obtained by condensing kerosene with phthalic anhydride in the presence of a Friedel-Crafts catalyst, and hydrolyzing the reaction product.

6. A composition of matter comprising the acid mixture obtained by condensing gasoline with phthalic anhydride in the presence of anhydrous aluminum chloride then hydrolyzing the reaction product.

7. A method for preparing acids from an essentially non-aromatic petroleum hydrocarbon which comprises heating it with the anhydride of a polycarboxylic acid in the presence of a Friedel-Crafts catalyst and thereafter hydrolyzing the reaction product.

8. A composition of matter comprising the acid mixture obtained by condensing an essentially non-aromatic petroleum hydrocarbon with phthalic anhydride in the presence of a Friedel-Crafts catalyst and hydrolyzing the reaction product.

9. A composition of matter comprising the acid mixture obtained by condensing an essentially non-aromatic petroleum hydrocarbon with the anhydride of a polycarboxylic acid in the presence of anhydrous aluminum chloride and hydrolyzing the reaction product.

10. In the method for preparing acids from an essentially non-aromatic petroleum hydrocarbon the steps which comprise heating it with phthalic anhydride in the presence of anhydrous aluminum chloride and hydrolyzing the reaction product with sodium carbonate.

11. A method for preparing acids from an essentially non-aromatic petroleum hydrocarbon which comprises heating it with the anhydride of a polycarboxylic acid in the presence of a Friedel-Crafts catalyst and an inert organic solvent then hydrolyzing the reaction product.

12. A composition of matter comprising the unhydrolyzed reaction product obtained by heating a petroleum hydrocarbon of essentially non-aromatic nature with the anhydride of a polycarboxylic acid in the presence of a Friedel-Crafts catalyst.

HERMAN A. BRUSON.